W. B. WEST.
Rubber-Cushion for Vehicle-Springs.

No. 199,886.   Patented Jan. 29, 1878.

UNITED STATES PATENT OFFICE.

WEBSTER B. WEST, OF WILMINGTON, OHIO.

IMPROVEMENT IN RUBBER CUSHIONS FOR VEHICLE-SPRINGS.

Specification forming part of Letters Patent No. 199,886, dated January 29, 1878; application filed October 12, 1877.

*To all whom it may concern:*

Be it known that I, W. B. WEST, of Wilmington, in the county of Clinton and State of Ohio, have invented a certain new and useful Rubber-Cushion Attachment for Spring-Vehicles; and I do hereby declare the following to be a full, clear, and exact description of the invention, such as will enable others skilled in the art to which it pertains to make and use it, reference being had to the accompanying drawings, which form part of this specification, in which—

Figure 1:
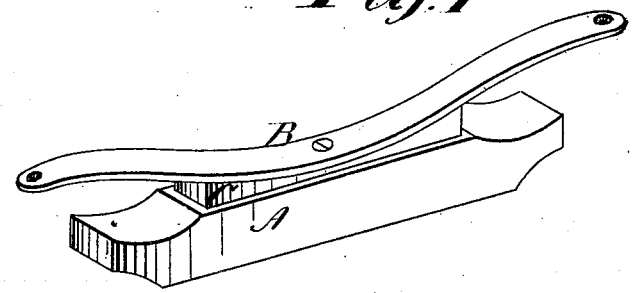
Figure 2:
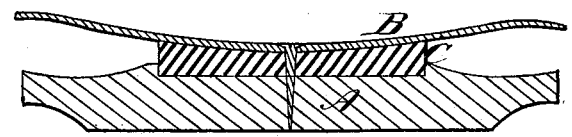

Figure 1 is a perspective view, and Fig. 2 a longitudinal sectional view, of my invention.

The object of this invention is to provide means for easing the weight or pressure upon the springs of buggies, and to diminish the tendency of such spring to break at or near their point of attachment to the axle.

The breaking of elliptic or curved springs on wheel-vehicles is usually caused by their being fastened to the axle by bolts at a distance of several inches apart, which renders the intervening portion of the spring perfectly solid and unyielding, and causes all the strain of the load to be imposed upon the weakest part of the spring.

My invention obviates the difficulty by embracing such an arrangement of the spring as will allow it to yield its entire length, and particularly in the center, where its yielding properties are the most effective.

My invention accordingly consists in interposing between the spring and the axle a rubber block or cushion, which is embedded in a recess or cavity of the axle, and to which, or through which to the axle, the spring is secured.

By the use of this cushion the spring is made as secure as if fastened to the axle directly; the cushion yields readily to the motions of the spring, and the elasticity of the middle or thickest portion of the spring is thus utilized; the sustaining power of the spring is greatly improved, and its motions rendered easy and pleasant.

Referring to the drawings, A designates the axle-cap of a buggy or other vehicle. B is the spring or the lower section thereof. C is the rubber cushion. The cushion is inserted in a suitable recess or cavity cut in the upper surface of the axle-cap. The spring is attached to the axle by bolts passing through the spring, cushion, and axle. The recess inclosing the cushion prevents displacement of the latter.

I do not claim, broadly, as my invention, the interposition of a rubber cushion between a metallic spring and its support; but

What I claim as new, and desire to secure by Letters Patent, is—

The combination, with the spring and axle-cap having a recess or cavity in its upper surface, of the interposed rubber cushion embedded in said cavity or recess, and projecting above the surface of the axle-cap, substantially as described.

In testimony that I claim the foregoing I have hereunto set my hand this 18th day of August, 1877.

WEBSTER B. WEST.

Witnesses:
EDWARD J. WEST,
Z. G. A. HAWORTH.